United States Patent
Diester et al.

(10) Patent No.: US 9,348,559 B2
(45) Date of Patent: *May 24, 2016

(54) INTERCONNECTING PORTAL COMPONENTS WITH DIALOG STATE TRANSITIONS

(71) Applicant: International Business Machines Corporation, Armonk, NY (US)

(72) Inventors: Matthias Diester, Stuttgart (DE); Stefan Liesche, Boeblingen (DE); Andreas Nauerz, Stuttgart (DE); Thomas Steinheber, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 14/138,726

(22) Filed: Dec. 23, 2013

(65) Prior Publication Data

US 2015/0178099 A1 Jun. 25, 2015

(51) Int. Cl.
*G06F 3/00* (2006.01)
*G06F 9/44* (2006.01)
*G06F 3/0481* (2013.01)

(52) U.S. Cl.
CPC ............... *G06F 8/20* (2013.01); *G06F 3/0481* (2013.01); *G06F 9/4443* (2013.01)

(58) Field of Classification Search
CPC ..................... G06F 17/30873; G06F 9/542
See application file for complete search history.

(56) References Cited

U.S. PATENT DOCUMENTS

| 8,429,597 B2 | 4/2013 | Prigge | |
|---|---|---|---|
| 2005/0060721 A1* | 3/2005 | Choudhary | G06F 9/542 719/318 |
| 2006/0053411 A1* | 3/2006 | Takamiya | G06F 17/227 717/115 |
| 2006/0282819 A1* | 12/2006 | Graham | G06F 17/241 717/113 |
| 2007/0209006 A1* | 9/2007 | Arthurs | G06F 17/3089 715/733 |
| 2008/0154690 A1* | 6/2008 | Mommeja | G06F 17/3089 705/7.13 |
| 2009/0100372 A1* | 4/2009 | Lauridsen | G06F 17/3089 715/781 |

(Continued)

OTHER PUBLICATIONS

Grace Period Disclosure, Reinhard Brosche, "IBM UX Screen Flow Manager", Verion 4 edited: Jul. 19, 2013, from website: <http://www-10.lotus.com/ldd/portalwiki.nsf/dx/IBM_UX_Screen_Flow..._>.

(Continued)

*Primary Examiner* — Omar Abdul-Ali
(74) *Attorney, Agent, or Firm* — Alexa L. Ashworth; Nicholas L. Cadmus; Noah A. Sharkan

(57) ABSTRACT

In one embodiment, a method for interconnecting portlets is disclosed. A first view is displayed on a computing device, wherein the first view is associated with a software application in a first state and includes a first portlet. A first event is received from the first portlet. A state model for the software application is accessed, wherein the state model includes a plurality of transitions between states of the software application, and wherein one transition of the plurality of transitions is triggered to bring the software application into a second state based on a type of the first portlet and data associated with the type of the first portlet. The one transition is executed to bring the software application into the second state, and a second view is displayed, wherein the second view is associated with the software application in the second state.

13 Claims, 6 Drawing Sheets

(56) References Cited

U.S. PATENT DOCUMENTS

2013/0152021 A1 6/2013 Hatfield et al.
2015/0178049 A1 6/2015 Diester et al.

OTHER PUBLICATIONS

Grace Period Disclosure, "PM88093: Combined WP & WCM V8.0.0.1 Cumulative Fix 006", retrieved on Dec. 23, 2013 from website: <http://www-01.ibm.com/support/docview.wss?uid=swg1PM8-8093>.

Grace Period Disclosure, "PM87596: Prerequisites for UX Flow Manager", retrieved on Dec. 23, 2013 from website: <http://www-01.ibm.com/support/docview.wss?uid=swg1PM87596>.

Diester et al., "Interconnecting Portal Components With Dialog State Transitions", U.S. Appl. No. 14/475,637, filed Sep. 3, 2014.

* cited by examiner

INTERCONNECTING PORTAL COMPONENTS WITH DIALOG STATE TRANSITIONS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): Web posting titled "IBM UX Screen Flow Manager", content provided by an inventor or a joint inventor made publicly available on Jul. 19, 2013.

Various aspects of the present invention have been disclosed by an inventor or a joint inventor in 8.0.0.1 Combined Cumulative Fix 006 for WebSphere Portal made publically available on Apr. 23, 2013. This disclosure is submitted under 35 U.S.C. 102(b)(1)(A). The following documentation is provided in support: PM87596: PREREQUISITES FOR UX FLOW MANAGER and PM88093: COMBINED WP & WCM V8.0.0.1 CUMULATIVE FIX 006.

FIELD OF THE INVENTION

The present invention relates generally to the field of visually modeling screen-flows and more particularly to portal application development.

BACKGROUND OF THE INVENTION

Implementers of web portal or web portlet (simply referred to as portals and portlets) based solutions attempt to guide users through a well-defined sequence of screens. These sequences route users along paths that interconnect user interface (UI) artifacts (e.g. forms, masks, etc.) that allow users to easily accomplish particular tasks. Users are relieved from thinking about the right order of navigation and processing of screens.

Traditionally, a portal is a whole site—a single point of access to various pages that providing resources called portlets. The layout of pages is highly customizable. The whole screen flow, and a transition, may be between two portlets residing on the same page, as well as between two portlets residing on different pages. The user will be forwarded to the page that is associated with the target (portlet) of the interaction. Traditionally, each information source gets its dedicated area on the page for displaying information (a portlet); often, the user can configure which portlets to display. Examples of portals include intranet "dashboards" for executives and managers. The extent to which content is displayed in a "uniform way" may depend on the intended user and the intended purpose, as well as the diversity of the content. Traditionally, design emphasis is on a certain "metaphor" for configuring and customizing the presentation of the content and the chosen implementation framework and/or code libraries. In addition, the role of the user in an organization may determine which content can be added to the portal or deleted from the portal configuration.

Portlets are pluggable user interface software components that are managed and displayed in a web portal. Portlets produce fragments of markup code that are aggregated into a portal. Typically, following the desktop metaphor, a portal page is displayed as a collection of non-overlapping portlet windows, where each portlet window displays a portlet. Hence a portlet (or collection of portlets) resembles a web-based application that is hosted in a portal. Some examples of portlet applications are email, weather reports, discussion forums, and news.

When developing portal based solutions, screens are usually provided by portlets. Moreover, the mapping of individual screens to portlets is often not trivial, since it has impact on both user experience as well as reusability. On one extreme, implementers can decide to let one single portlet provide all necessary screens; conversely, implementers can decide to develop one dedicated portlet for each of these screens and thus, for each single function required to accomplish a particular task.

SUMMARY

Aspects of an embodiment of the present invention disclose a method, computer program product, and computing system for interconnecting portlets. The method includes causing a first view to be displayed on a computing device, wherein the first view is associated with a software application in a first state of a plurality of states of the software application, and wherein the first view includes a first portlet. The method further includes receiving a first event from the first portlet, wherein the first event includes an indication of a type of the first portlet and data associated with the type of the first portlet. The method further includes accessing a state model for the software application, wherein the state model includes a plurality of transitions between states of the software application, and wherein one transition of the plurality of transitions is triggered to bring the software application in to a second state of the plurality of states of the software application based on the type of the first portlet and the data associated with the type of the first portlet. The method further includes one or more processors executing the one transition of the plurality of transitions to bring the software application in to the second state of the plurality of states of the software application. The method further includes causing a second view to be displayed on the computing device, wherein the second view is associated with the software application in the second state.

DETAILED DESCRIPTION

Figure 1:
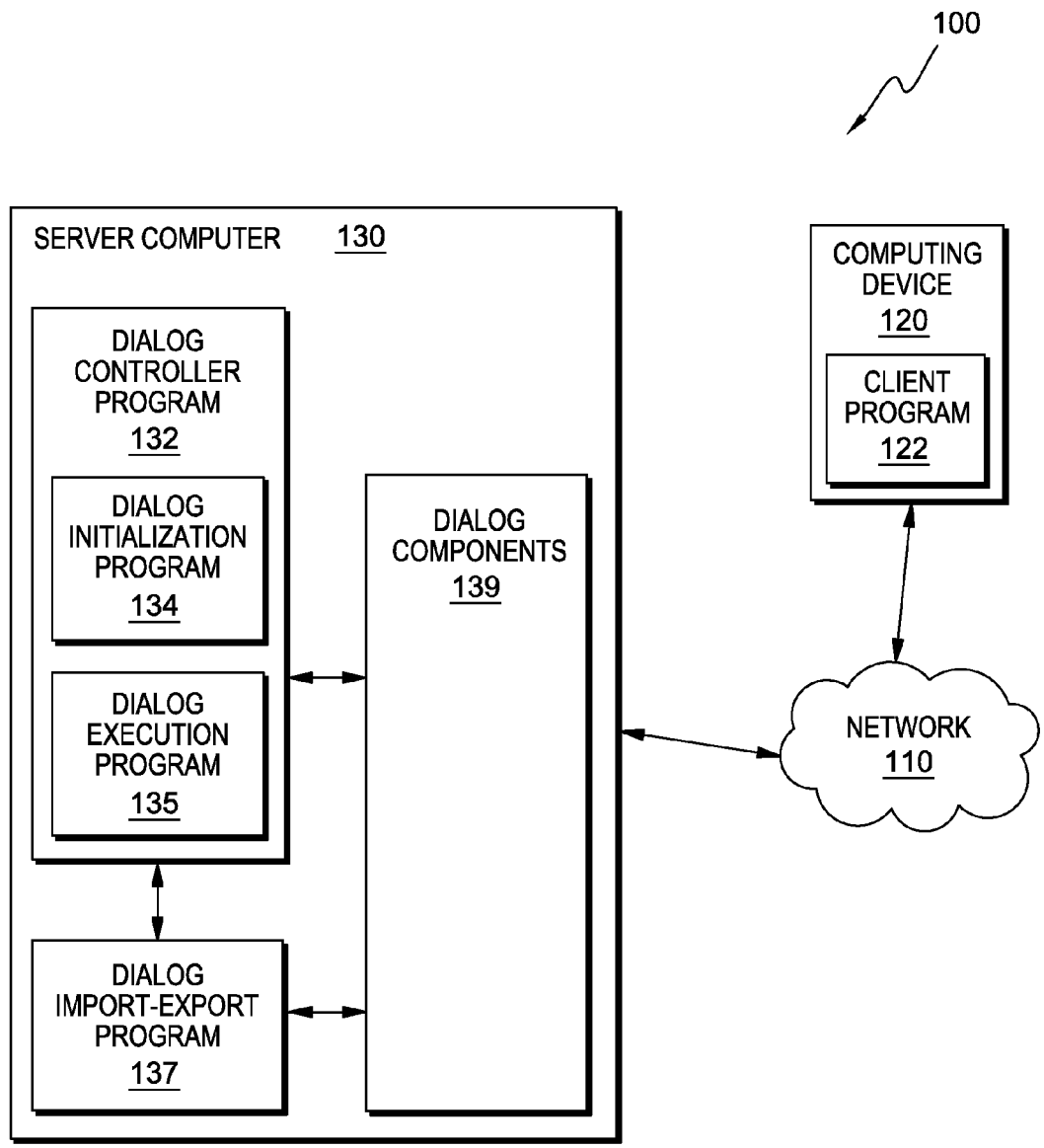
FIG. 1 is a diagram of a network computer environment, in accordance with one embodiment of the present invention.

The need for a well-defined sequence of web pages and screen-flows exists across many industries. For instance, in the insurance industry, screen-flow implementers might need to model a workflow for processing policy quotes or claim submissions. In particular, quoting a vehicle insurance policy may contain steps like vehicle selection, vehicle data specification, insurance data collection, cost characteristics selection, and so forth. Similar applications include: banking, help desks, and travel booking applications.

The "one portlet fits all" approach implies developing one single monolithic application that is, due to its complexity, hard to maintain, poorly scalable and, due to its non-modular character, difficult to reuse. However, this approach provides developers and screen-flow implementers with the highest control for guiding users through the flow. In contrast, the "one portlet per screen" approach offers much higher flexibility and increases options for reusability tremendously. Hence, guiding users becomes less strict and less controllable, which may increase the danger of erroneous navigation. Nevertheless, either developers have to "hard-wire" portlets, which may reduce flexibility, or users have to find out about the intended flow, which may increase the risk for incorrect usage. In general, there is no single right answer for the "right" granularity, which often leads to time consuming discussions and decisions depending on the actual scenario to be implemented. To ease the creation of the described modeling process, a visual modeling tool may allow a user-oriented assembly of pages and portlets within a user interface. A visual modeling tool may help an administrator to define screen-flows and dialogs by visually orchestrating portal execution flow paths.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. The following figures provide an illustration of one embodiment. The embodiment, taken in part or in whole, does not imply any limitations with regard to the environments in which different embodiments may be implemented.

FIG. 1 depicts a diagram of network computer environment 100, in accordance with one embodiment of the present invention. Network computer environment 100 includes computing device 120 and server computer 130 interconnected over network 110. Network 110 may be a local area network (LAN), a wide area network (WAN) such as the Internet, any combination thereof, or any combination of connections and protocols that will support communications between computing device 120 and server computer 130, in accordance with embodiments of the invention. Network 110 may include wired, wireless, or fiber optic connections. Network computer environment 100 may include additional computers or other devices not shown.

Computing device 120 is used by a user of client program 122, which accesses dialog controller program 132, via network 110, on server computer 130. Computing device 120 may be a management server, a web server, or any other electronic device or computing system capable of receiving and sending data. In another embodiment, computing device 120 may be a laptop computer, tablet computer, netbook computer, personal computer (PC), a desktop computer, a personal digital assistant (PDA), a smart phone, or any programmable electronic device capable of receiving and sending data.

In various embodiments, computing device 120 is the same computer as server computer 130, connected to other computer devices (not shown). In other embodiments, computing device 120 communicates to other computers on network 110 in a peer-to-peer fashion, where all computers share equivalent responsibility for processing data. In other embodiments, computing device 120 may represent a server computing system utilizing multiple computers as a server system, such as in a cloud computing environment.

In the depicted embodiment, client program 122 accesses dialog controller program 132, via network 110, on server computer 130. In various embodiments, "web portal" is a collection of web portlets, and web portlets are functions of an application. In the depicted embodiment, the client program 122 is known as a "web portal" or "web portlet," and for simplicity, both terms will be referred to as a portal. Client program 122 can also be, but is not limited to: (i) a conventional browser capable of communicating with dialog controller program 132; (ii) a software plug-in to a conventional browser able to communicate with dialog controller program 132; (iii) an off-the-shelf program or custom program where either are capable of communicating with dialog controller program 132. In various embodiments, client program 122 is located on server computer 130, or another device, not shown, as long as the host device can communicate with computing device 120 and server computer 130.

Server computer 130 provides access to dialog services for users of dialog controller program 132. In the depicted embodiment, server computer 130 contains dialog controller program 132, dialog initialization program 134, dialog execution program 135, dialog import-export program 137, and dialog components 139. Server computer 130 may be a management server, a web server, or any other electronic device or computing system capable of receiving and sending data. In another embodiment, server computer 130 may be a laptop computer, tablet computer, netbook computer, personal computer (PC), a desktop computer, a personal digital assistant (PDA), a smart phone, or any programmable electronic device capable of receiving and sending data.

In various embodiments, server computer 130 is the same computer as computing device 120, connected to other computer devices (not shown). In other embodiments, server computer 130 communicates to other computers on network 110 in a peer-to-peer fashion, where all computers share equivalent responsibility for processing data. In other embodiments, server computer 130 may represent a server computing system utilizing multiple computers as a server system, such as in a cloud computing environment.

In one embodiment, dialog controller program 132 provides dialog services to users of the dialog controller program 132. Dialog controller program 132, in conjunction with dialog components 139, transitions, in a state-machine-like fashion, from dialog state to dialog state based on events emitted by portals. The dialog is a logical aggregate of transitions. Executing a transition is considered as a "step," and the step brings the user to a different displayed view (by triggering an event in the target portlet of the transition and navigating to the target page). In one embodiment, the components of a dialog can be described using Extensible Markup Language (XML).

One example of a dialog is that of collecting data for a flight booking application on the portal, such as client program 122, which initiates a flight booking dialog on server computer 130. An event occurs, such as the user entering the flight origin on client program 122, which activates the flight booking dialog on dialog controller program 132. The user may enter a flight origin in client program 122, which becomes an event and triggers the flight booking dialog to gather and present information on available flights to the user. Moreover, the flight booking dialog may initiate other events, for example like special price offers given to travelers from the flight origin. Additionally, the flight dialog may require gather further user information, such as name or travel number, which would allow other events to trigger other states; such as, giving the traveler an opportunity to trade in air-miles or attain extra air-miles.

An event is an action taken by a user of client program 122, although, events can trigger other events, and even a whole series of events. For instance, in a portlet, a user selects origin of travel. In another portlet the user selects departure date of travel. In another portlet the user selects a return date. Finally, in another portlet the user selects the destination. These actions could be reflected by four different events: select origin, select departure date, select return, and select destination, In one embodiment, dialog initialization program 134 is the bootstrapping process to prepare a dialog ready for execution. The bootstrapping process entails determining the right dialog to be the active dialog. The active dialog is certified to be capable of proper execution.

In one embodiment, dialog execution program 135 executes and transitions the dialog to the next state. The event data and the event are used to determine the next transition, if any. Any dialog context data and webpages are created for the next transition to the target portlet/page. The target portlet may provide controls to gather further information from the user. Additionally, any event data that arrives with the event is translated to the correct format.

In one embodiment, dialog import-export program 137 provides the importing and exporting of dialog definitions. Along with the dialog definitions, dialog import-export program 137 also provides for importing and exporting of resources that are necessary for executing the dialog definitions, such as, pages, portlets, metadata, and functions that are referenced by the dialog definition. One use of dialog import-export program 137 is the transferring of a dialog definition from one installation to another. Rather than creating all the steps of a dialog on each installation, import-export program 137 can import all data in dialog controller program 132 and dialog components 139, and package the data so that the data can be imported at a later date, possibly on another server computer.

In one embodiment, dialog components 139 contains several software containers and pluggable and extendable software registries for the purpose of execution and validation of dialogs. Dialog controller program 132 and dialog import-export program 137 both communicate with one or more of the software containers or software registries of dialog components 139. Components of dialog components 139 are fully detailed in FIG. 2.

Figure 2:
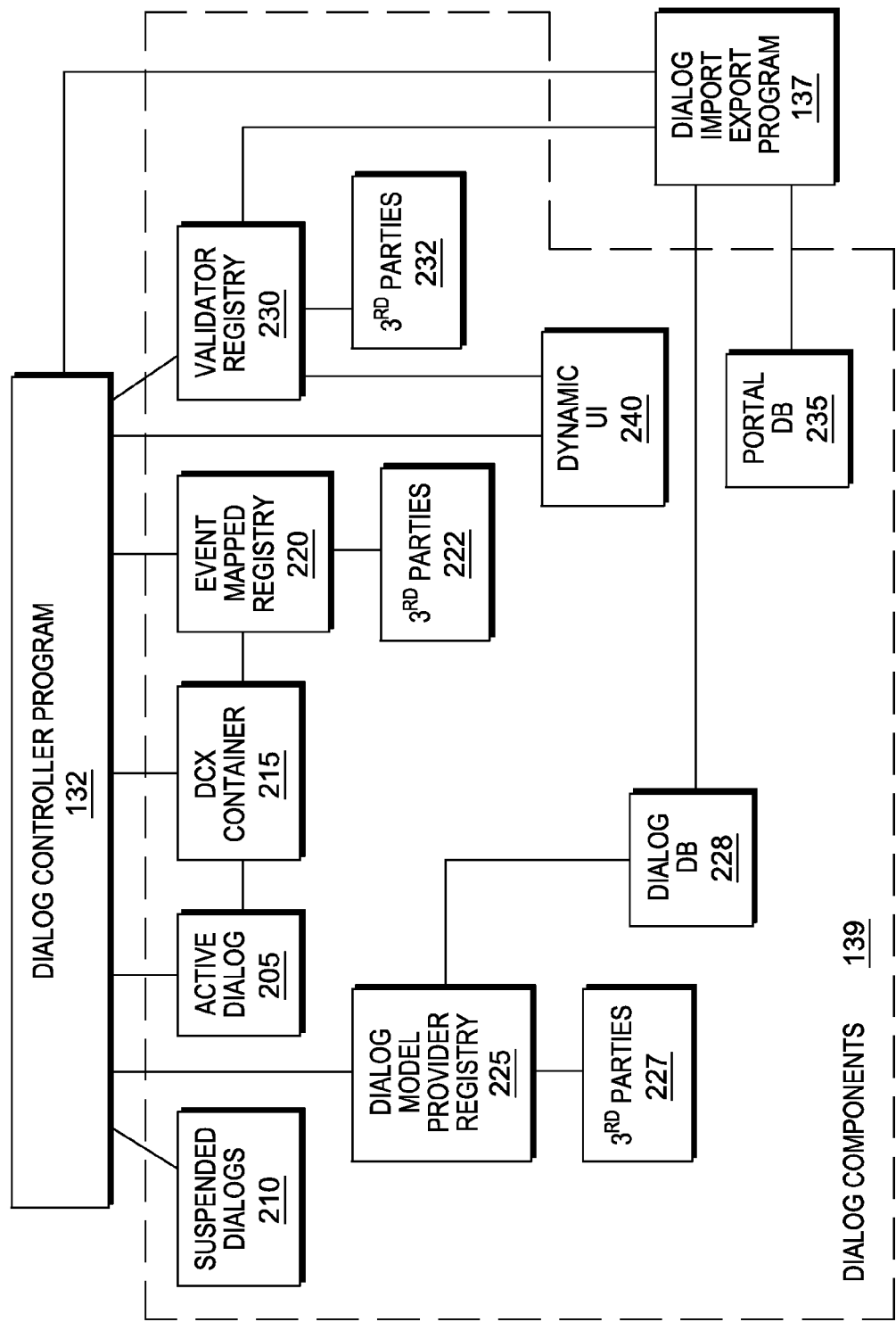
FIG. 2 is a diagram of the dialog components, in accordance with one embodiment of the present invention.

FIG. 2 is a diagram depicting dialog components 139, in accordance with one embodiment of the present invention. Dialog components 139 contains dialog import-export program 137, active dialog 205, suspended dialogs 210, dialog context (DCX) container 215, event mapped registry 220, third-parties 222, dialog model provider registry 225, third-parties 227, dialog database 228, validator registry 230, third-parties 232, portal database 235, and dynamic UI 240.

Active dialog 205 is the dialog that dialog controller program 132 is currently processing. For instance, when the user selects the flight booking application on client program 122, dialog controller program 132 loads the dialog about flight bookings into active dialog 205, which is considered the executing copy of flight bookings dialog. The dialog may be loaded from dialog model provider registry 225 or from suspended dialogs 210. There can only exist one active dialog per user at one time. For instance, travel agent "A" may have an active instance and travel agent "B" may have an active instance as well.

In one embodiment, there can only exist one active dialog per user at one time. Suspended dialogs 210 contains all dialogs that dialog controller program 132 was, at one point, processing and are currently not active. For instance, if a user starts a dialog and is for some reason interrupted from completing all data required by the dialog, the dialog is suspended until the user can resume. For example, a flight booking agent is filling out a dialog for customer "A," and is interrupted by another customer, "B." The fight booking agent can suspend "A's" dialog, place it into suspended dialogs 210, and activate a dialog for "B." At some later time, the flight booking agent can re-activate "A's" dialog from suspended dialogs 210 and continuing filling in required data. The actual suspension and activation is controlled by dialog controller program 132 by sending an event.

In one embodiment, DCX container 215 is the repository where all dialog context data associated with a dialog is kept. Dialog context data is all the information that is gathered from executing the dialog. In one embodiment, when a dialog is executing dialog controller program 132 is storing the dialog context data in DCX container 215. For instance, a dialog that determines flight information stores the flight information in DCX container 215. DCX container 215 can be, but is not limited to, a conventional database, a session store, a browser cookie keeping information, custom table entries separated by meta-characters, a flat file, as someone skilled in the arts would recognize.

Data being presented at the portlet or being obtained from the portlet is known as event data. Event data is also sometimes referred to as "payload data." Usually an event has a certain name—e.g. "flightSelected" and carries certain associated payload data—e.g. DL4293. Conversely, data stored in DCX container 215 is dialog context data. The formats of each may be different depending upon implementation. The depicted embodiment contains mechanisms to convert back-and-forth from one data type to the other. The two mechanisms are stored in event mapped registry 220. Event mapped registry 220 provides a mechanism, referred to as event-to-context-mapper (not shown), to alter event data into dialog context data, a format acceptable by DCX container 215, and another mechanism to alter dialog context data into event data, referred to as context-to-event mapper (not shown). For instance, the event-to-context-mapper transforms the data sent by a portlet, the event data, into dialog context data—and stores this piece of data in the DCX segment. The context-to-event mapper does just the opposite. The context-to-event mapper transforms dialog context data into a format that is acceptable by a portal, event data.

For example, the flight booking portlet might contain an origin date in the format of month-day-year, where year is four numerals. The event-to-context-mapper determines if the format is compatible with the dialog context data definition in DCX container 215. When the event data is compatible, the event-to-context-mapper simply stores the data; otherwise, the event-to-context-mapper alters the event data to be compatible with the dialog context data definition in DCX container 215. Now, if another portlet, for example one that books a car rental, could use the origin date, the context-to-event mapper would read the origin date from DCX container 215 and format the dialog context data into an event data format compatible with car rental booker portlet.

Furthermore, third-parties 222 is a repository for pluggable architectures provided by third parties. Third parties 222 can provide event-to-context-mapper software and context-to-event-mapper software. One application for third-parties 222 is a situation where third parties update their portals, third parties can immediately provide a new version of one or both mappers.

In one embodiment, dialog model provider registry 225 is a repository for dialog definitions. When an event occurs, dialog controller program 132 reads dialog model provider registry 225 to acquire the dialog definition associated with the event. In one embodiment, dialog controller program 132 determines which dialog to load based upon the event signature, as someone skilled in the arts would recognize. In other embodiments, dialog controller 132 determines which dialog to load simply based upon the name of the event. For instance, when a user produces an event by selecting the flight booking application, after determining that the dialog is not a suspended dialog, dialog controller program 132 loads the dialog from dialog model provider registry 225 and invokes the execution of the dialog. Specifically, dialog controller program 132 may load the dialog into active dialog 205. Furthermore, third-parties 227 is a repository for pluggable dialog models provided by third parties.

In one embodiment, dialog database 228 is another repository for storing the dialog model provider registry pluggable architectures. For instance, there may be one transient dialog model provider that is providing dialog definitions that are not persisted, (e.g. definitions only valid for within a certain timeframe). There may be one third-party dialog model provider representing a custom implementation of a dialog model provider, but the default implementation of the provider (there may be various) calls against the database. Dialog database 228 is one persistence layer for a given dialog model provider.

In one embodiment, validator registry 230 is a repository for storing all the validators that are available for validating a dialog definition. As dialog can come from various sources, it is impossible to control their correctness, thus the implementer of the dialog should also provide a validator to confirm that the dialog is properly used. Validating a dialog definition means that the dialog is valid and appropriate. A valid dialog is one where all the necessary dialog context data is consistent as well as all components required for executing the dialog—such as portal resources—are present. However, a custom validator may check for any information of any kind. An appropriate dialog is one that is suitable for the situation or the context data. For example, when a user produces an event by selecting the flight booking application, dialog controller program 132 loads the dialog from dialog model provider registry 225, however, before loading, dialog controller program 132 executes validator registry 230 in order to confirm that the dialog has all necessary data and that the dialog is valid for the situation. For instance, a dialog that contains special offers for Mondays cannot be used on other days of the week. If the user generates an event that invokes the special offers for Monday dialog on a day other than Monday, validator registry 230 generates an error. A particular validator could also validate data, for instance, if a user enters a travel date that is in the past, the validator flags that as inconsistent data. The dialog in error can either abort or the user may be allowed to attempt to fix the error. Furthermore, third-parties 232 is a repository for pluggable validators provided by third parties.

In various embodiments, portal database 235 is connected to a portal import-export. Portal database 235 is used for storing all other already existing artifacts of a portal system such as definitions of pages, localization data, association of portlets to pages, layout information for pages, access control information, user specific preferences and so forth.

In one embodiment, dynamic UI 240 is a repository for storing components associated with dynamically launching/creating portal user interfaces. This includes the dynamic creation of a temporary page (e.g. living only for the current session) which may be derived from a page template. These components include, but are not limited to: webpages, information on look and feel of a webpage, and controls on a webpage, such as selection boxes. While there is no time-limit, dynamic UI components are used to build webpages that are transient, with a short life span.

Figure 3:
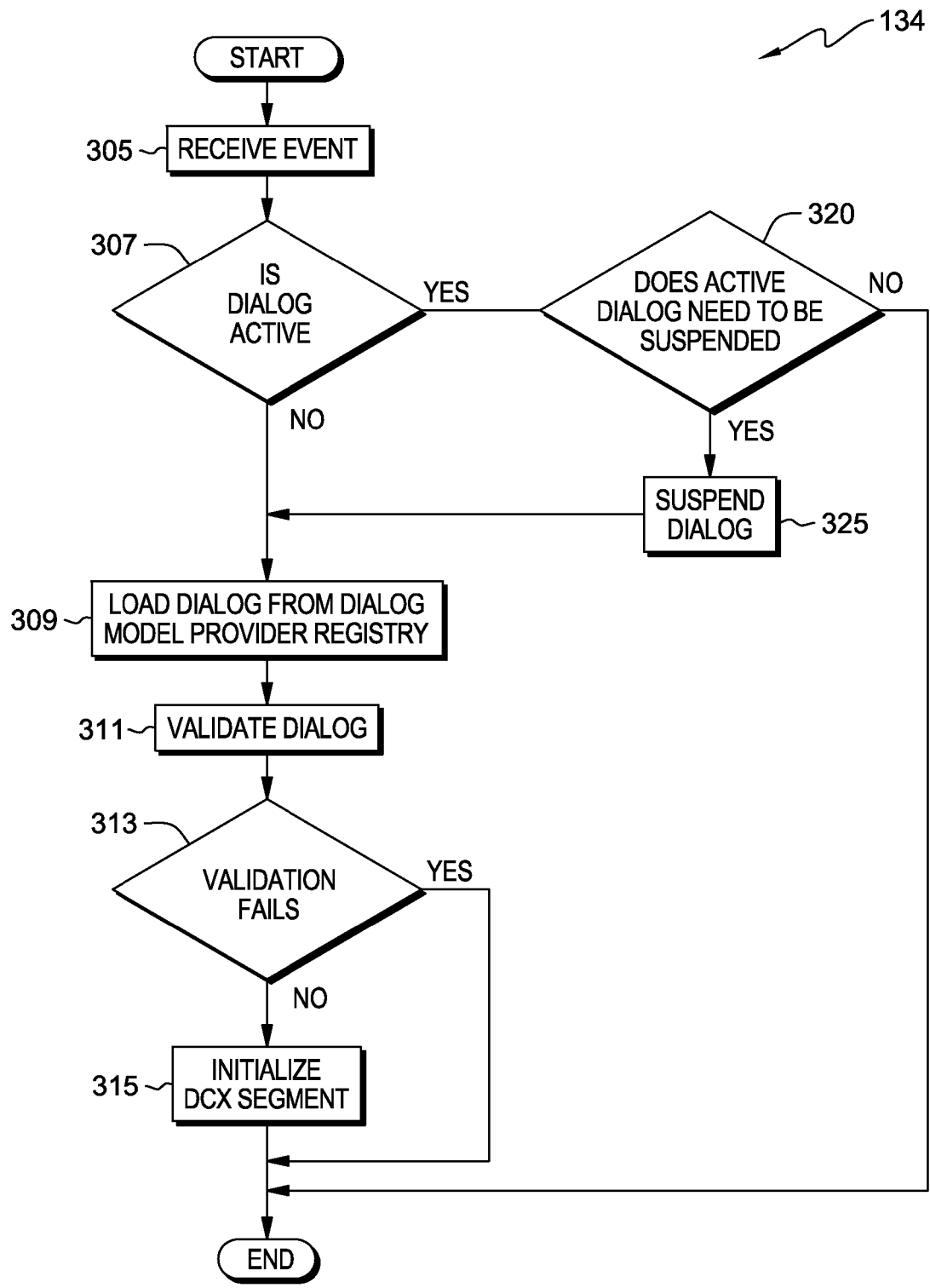
FIG. 3 is a flowchart depicting operational steps of the dialog initialization program, in accordance with one embodiment of the present invention.

FIG. 3 is a flowchart depicting operational steps of dialog initialization program 134, in accordance with one embodiment of the present invention. Dialog initialization program 134 is invoked by dialog controller program 132 when an event associated with the dialog is received from a portlet. In other embodiments, dialog initialization program 134 and dialog controller program 132 are tightly integrated, and thus functions and steps of either program are commingled.

In step 305, dialog initialization program 134 receives an event. In one embodiment, the event is passed as an argument from dialog controller 132 when an event occurs on a portlet and/or is emitted from a portlet. In other embodiments, the passing is by reference, as someone skilled in the arts would recognize.

In decision step 307, dialog initialization program 134 determines if an instance of the dialog associated with the event received is active. Dialog initialization program 134 checks active dialog 215 to determine if the active dialog is the instance of the dialog associated with the event received. When instance of the dialog associated with the event received is not active, dialog initialization program 134 transitions to step 309 (decision step "NO" branch). When dialog associated with the event received is active, dialog initialization program 134 transitions to step 320 (decision step "YES" branch).

In step 309, dialog initialization program 134 loads the dialog from dialog model provider registry 225. In one embodiment, dialog initialization program 134 asks dialog model provider registry 225 for a dialog with the same signature, as someone skilled in the arts would recognize as the dialog characteristics from the previously received event. Dialog initialization program 134 is asking for a dialog that is capable of processing the previously received event. In one embodiment, the dialog is not truly yet instantiated, before the dialog can become an executable dialog the dialog must be validated.

In step 311, dialog initialization program 134 validates the dialog. Dialog initialization program 134 obtains a list of validators from validator registry 230. The list of validators may be empty to many validators. In one embodiment, dialog initialization program 134 takes each validator, in order, from the list of validators and executes the validation routine. For example, if a user selected a dialog that contains specials for Monday on a day other than Monday the validation routine would produce an error.

In decision step 313, dialog initialization program 134 determines if the dialog is valid. Dialog initialization program 134 monitors each validation routine for an error. In one embodiment, dialog initialization program 134 determines that the dialog is not valid on the first error encountered. In other embodiments, all the validators are executed and dialog initialization program 134 determines whether the errors generated by the validators are significant enough to prevent dialog from executing. When dialog initialization program 134 determines that the dialog has failed validation, dialog initialization program 134 terminates (decision step "YES" branch). When dialog initialization program 134 determines that the dialog is valid, dialog initialization program 134 transitions to step 315 (decision step "NO" branch).

In step 315, dialog initialization program 134 initializes DCX segment. A segment is the name of the "location" in DCX container 215 where information about an instance is stored. DCX container 215 is the repository for context data. A DCX segment is opened for each dialog instance. A DCX segment is a data container within DCX container 215 that is associated with a given dialog instance. A dialog instance is a runtime representation of a dialog definition. A runtime representation of a dialog definition is supplemented with data in DCX container 215 and the preceding steps that have been executed. For instance, several travel agents working on different clients will each have a dialog instance running representing the same dialog definition, e.g. "Hotel Booking," with different context data representing their client information stored in their respective DCX segment. For each dialog instance that is being initialized, or created, a DCX segment is created in DCX container 215. In the depicted embodiment, in DCX container 215 there is an area called "segment" that contains all the information about different users who are executing (probably at different stages) the dialog steps—one segment per executing user—hence one segment per dialog instance. In other embodiments, a segment is a data record that contains data about each client and the stages transitions are separate.

In decision step 320, dialog initialization program 134 determines whether to suspend the active dialog. Dialog initialization program 134 determines if the active dialog is the dialog associated with the dialog context data by examining the context data. A dialog may consist of many transitions, which may branch and so forth (similar to transitions in a state machine). For example, a travel booking dialog may contain: a first state, start-transition, a transition triggered by a start-selected event, a transition triggered by a destination-selected event, and a transition triggered by a select-hotel-category event. With the start-transition state, a dialog is activated and the next transitions take place in the context of said activated dialog, and all executing under "Context A, e.g. booking for JD." If there is another start-transition being triggered by an event (e.g. because a customer came into the store "BB") dialog initialization program 134 will suspend the "JD" dialog and initialize the dialog "BB." Various embodiments will examine other components of the active dialog to determine to suspend, and still others examine the segment name for the determination. There are many varied methods to determine whether to suspend. When dialog initialization program 134 determines not to suspend, dialog initialization program 134 terminates (decision step "NO" branch). When dialog initialization program 134 determines to suspend, dialog initialization program 134 transitions to step 325 (decision step "YES" branch).

In step 325, dialog initialization program 134 suspends the active dialog. Dialog initialization program 134 places the active dialog into suspended dialog 210. Dialog initialization program 134 creates the necessary instance within suspended dialog 210 to hold the dialog until the suspended dialog is re-loaded.

Figure 4:
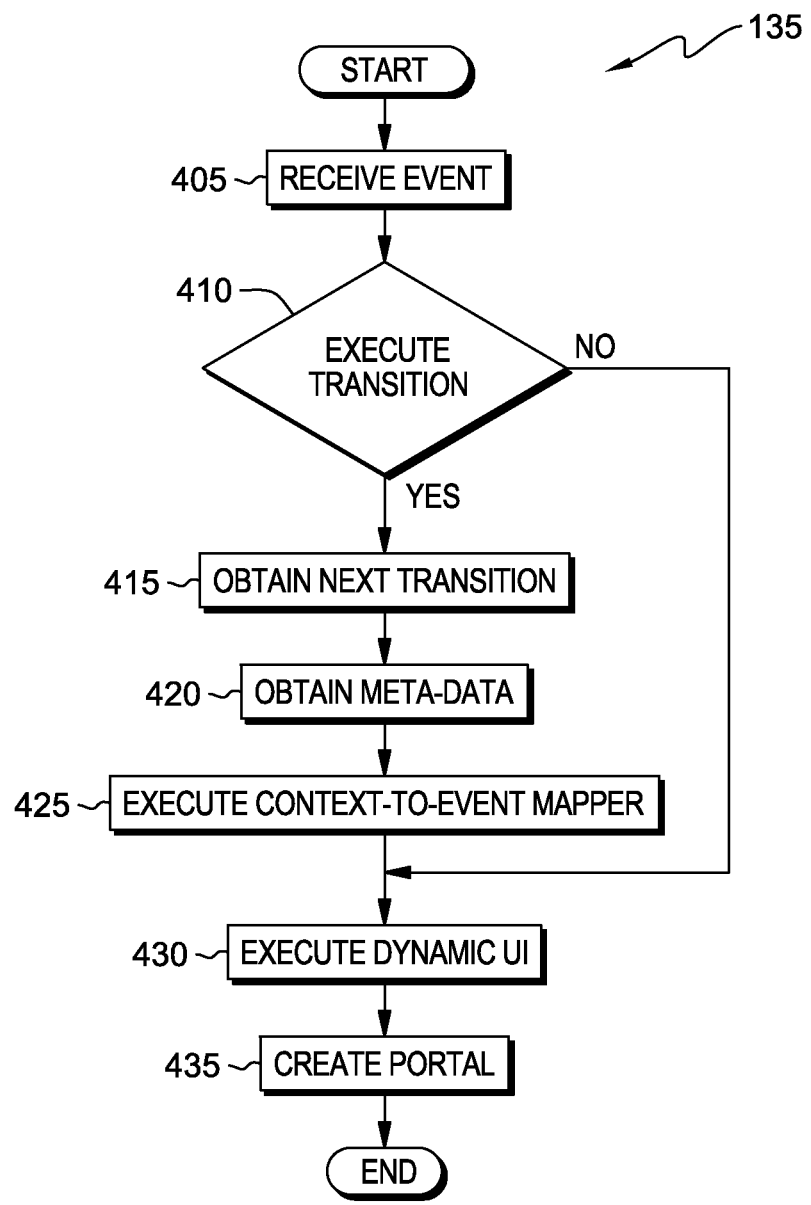
FIG. 4 is a flowchart depicting operational steps of the dialog execution program, in accordance with one embodiment of the present invention.

FIG. 4 is a flowchart depicting operational steps of dialog execution program 135, in accordance with one embodiment of the present invention. Dialog execution program 135 is invoked by dialog controller program 132 after dialog initialization program 134 has completed. In other embodiments, dialog execution program 135 and dialog controller program 132 are tightly integrated, and thus functions and steps of either program are commingled.

In step 405, dialog execution program 135 receives an event. In one embodiment, the event is passed as an argument from dialog controller 132 when an event occurs on a portlet. In other embodiments, the passing is by reference, as someone skilled in the arts would recognize.

In decision step 410, dialog execution program 135 determines whether or not to execute a state transition. The decision is based on the event information received. Dialog execution program 135 examines the event name, payload, and the portlet from which the event was sent, to determine whether a transition needs to be executed. The actual transition is obtained in the following steps. For instance, the dialog deals with four events A, B, C, and D, however dialog execution program 135 just received the event E, so there is no transition to be looked up for this dialog, which would be out of this scope of probability. When dialog execution program 135 determines to execute a state transition, dialog execution program 135 transitions to step 415 (decision step "YES" branch). When dialog execution program 135 determines not to execute a state transition, dialog execution program 135 transitions to step 430 (decision step "NO" branch).

In step 415, dialog execution program 135 obtains the next state transition from the DCX segment in DCX container 215 to be executed. Dialog execution program 135 looks up the next transition from a state transition table. In one embodiment, the state transitions are kept in a state transition table, as someone skilled in the arts would recognize. In other embodiments, the state transitions are kept in the DCX segment.

In step 420, dialog execution program 135 obtains metadata associated with the event. Dialog execution program 135 reads metadata from DCX container 215 associated with the event. In one embodiment, the metadata is stored in the DCX segment. In other embodiments, the metadata is stored in another repository and the DCX segment contains a pointer or index to the metadata record. The metadata contains various means to deal with the transition, including a reference to which event-to-context mapper to invoke, if any. To be clear, the metadata is associated with the transition that is about to be executed. The metadata is part of the transition. The event only carries the information [eventName, eventPayloadData].

In step 425, dialog execution program 135 executes context-to-event mapper. The context-to-event mapper formats data for the next portlet. For instance, suppose the next transition for flight booking is to obtain meal information. Suppose, in an earlier event, dialog execution program 135 stored in the context data that the passenger is vegetarian. Based on this context information, dialog execution program 135 selects a vegetarian meal.

In step 430, dialog execution program 135 obtains and executes dynamic UI components based upon transition metadata. Using information stored in the metadata dialog execution program 135 retrieves dynamic UI components from dynamic UI 240. Residing on a webpage there are many portlets visible to a user. Metadata provides the dynamic creation and launching of a new page, whose lifetime is limited to a certain function for the user, and then deleted. For instance, in the flight booking example, the user has on the main tab information on flight booking, rental car booking and hotel booking, and these are always present. For whatever reason, the user interjects in the current navigation something extra ordinary—for example, booking a concert, which is atypical, and not on the main tab for business travel. Using dynamic UI 240, dialog execution program 135 launches a webpage, possibly on another tab, that contains concert information. Unlike the main page, the concert page is only available for a limited lifetime.

In step 435, dialog execution program 135 creates a portlet. Dialog execution program 135 invokes the event data that has been gathered, along with any payload data, for the target portlet. Dialog execution program 135 may need to invoke the portlet, or the target portlet may be already instantiated. For instance, in the flight booking example, the next event to occur might be to select payment. Using information gathered before, such as traveler's name, and delivered as payload data, dialog execution program 135 sends this information to the portal that would deal with payment.

Figure 5:
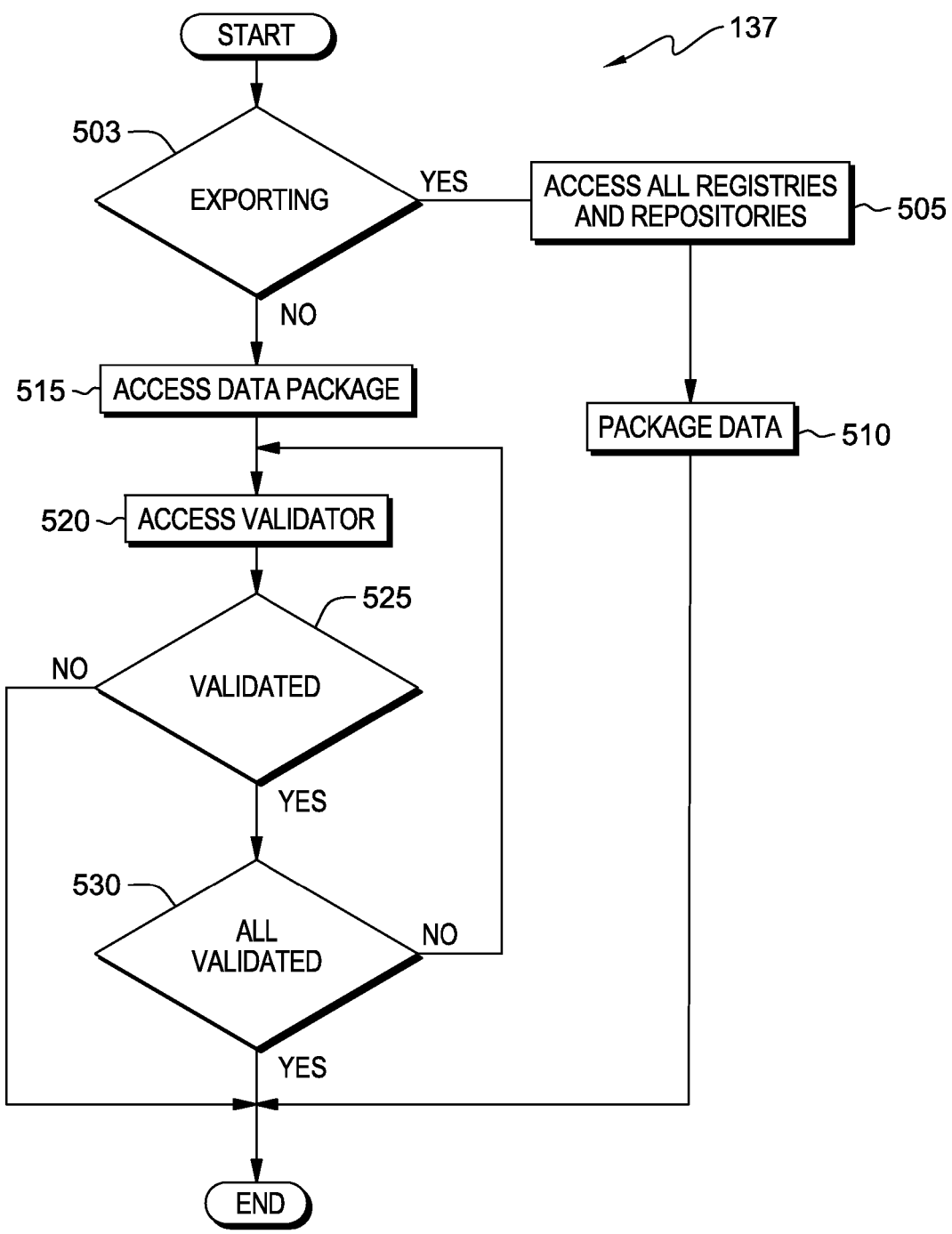
FIG. 5 is a flowchart depicting operational steps of the dialog import-export program, in accordance with one embodiment of the present invention.

FIG. 5 is a flowchart depicting operational steps of dialog import-export program 137, in accordance with one embodiment of the present invention. Dialog import-export program 137 is invoked by dialog controller program 132 from an event, typically by an administrator. In other embodiments, dialog import-export program 137 and dialog controller program 132 are tightly integrated, and thus functions and steps of either program are commingled.

In decision step 503, dialog import-export program 137 determines whether to import data or to export data. Dialog import-export program 137 is passed an argument, by the calling routine that contains, or has reference to, an enumeration indicating to import or to export. In one embodiment, the calling routine is a portlet that contains a control to select importing or exporting. When exporting, dialog import-export program 137 transitions to step 505 (decision step "YES" branch). When importing, dialog import-export program 137 transitions to step 515 (decision step "NO" branch).

In step 505, dialog import-export program 137 accesses all registries and repositories associated with server computer 130. Dialog import-export program 137 reads all the data out of each of the registries and repositories. In one embodiment, dialog import-export program 137 adds metadata and delimiters to facilitate importing data.

In step 510, dialog import-export program 137 packages the data read in a previous step. Packaging data, as someone skilled in the arts would recognize, is compressing and preparing the compressed data for transport. Transporting data can be done by storing the data on to electronic media, or transmitting the data over network 110.

In step 515, dialog import-export program 137 accesses the packaged data that was prepared earlier by a previous invocation of dialog import-export program 137. Accessing the data can be by reading media, or receiving the data over network 110.

In step 520, dialog import-export program 137 accesses a validator. Dialog import-export program 137 accesses one of the validators out of the validator registry 230. Dialog import-export program 137 users each validator to validate the associated dialog that is being imported to verify that the dialog still functions as the dialog did on the server computer the dialog was taken from. Dialog import-export program 137 keeps a list of all the validators to execute.

In decision step 525, dialog import-export program 137 determines if the dialog was validated. When the dialog is validated, import-export program 137 transitions to step 530. (Decision step "YES" branch). When the dialog is not validated, dialog import-export program 137 terminates (decision step "NO" branch).

In decision step 530, dialog import-export program 137 determines there are no further validators to execute. Dialog import-export program 137 keeps tracks which validator on the list has been executed. When all the validators have executed, import-export program 137 terminates (decision step "YES" branch). When all the validators have not been executed, dialog import-export program 137 transitions to step 520 (decision step "NO" branch).

Figure 6:
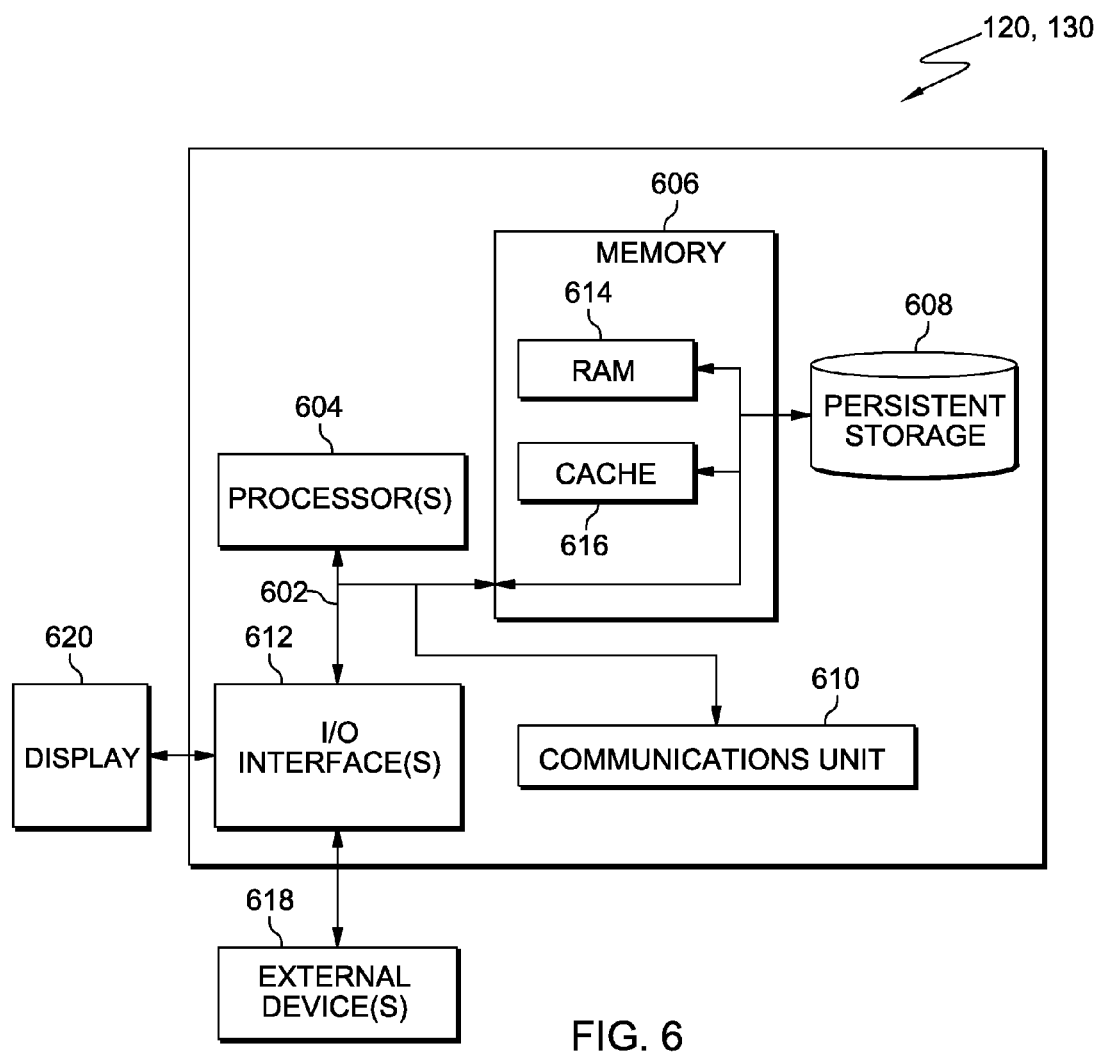
FIG. 6 depicts a block diagram of components of the computers of FIG. 1, in accordance with one embodiment of the present invention.

FIG. 6 depicts a block diagram of components of computing device 120 and server computer 130, in accordance with one embodiment of the present invention. It should be appreciated that FIG. 6 provides only an illustration of one implementation and does not imply any limitations with regard to the environments in which different embodiments may be implemented. Many modifications to the depicted environment may be made.

Computing device 120 and server computer 130 each include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Client program 122 is stored in persistent storage 608, of computing device 120, for execution and/or access by one or more of the respective computer processors 604 via one or more memories of memory 606. Dialog controller program 132, dialog initialization program 134, dialog execution program 135, dialog import-export program 137, and dialog components 139 are stored in persistent storage 608, of server computer 130, for execution and/or access by one or more of the respective computer processors 604 via one or more memories of memory 606.

In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110 and other devices (not shown). In these examples, communications unit 610 includes one or more network interface cards. Communications unit 610 may provide communications through the use of either or both physical and wireless communications links.

Client program 122 may be downloaded to persistent storage 608, of computing device 120, through communications unit 610 of computing device 120. Dialog controller program 132, dialog initialization program 134, dialog execution program 135, dialog import-export program 137, and dialog components 139 may all be downloaded to persistent storage 608, of server computer 130, through communications unit 610 of server computer 130.

I/O interface(s) 612 allows for input and output of data with other devices that may be connected to computing device 120 and/or server computer 130. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards.

Software and data used to practice embodiments of the present invention, e.g., client program 122, can be stored on such portable computer-readable storage media and can be loaded onto persistent storage 608, of computing device 120, via I/O interface(s) 612 of computing device 120. I/O interface(s) 612 also connects to display 620. Software and data used to practice embodiments of the present invention, e.g., dialog controller program 132, can be stored on such portable computer-readable storage media and can be loaded onto persistent storage 608, of server computer 130, via I/O interface(s) 612 of server computer 130. Software and data used to practice embodiments of the present invention, e.g., dialog initialization program 134, can be stored on such portable computer-readable storage media and can be loaded onto persistent storage 608, of server computer 130, via I/O interface(s) 612 of server computer 130. Software and data used to practice embodiments of the present invention, e.g., dialog execution program 135, can be stored on such portable computer-readable storage media and can be loaded onto persistent storage 608, of server computer 130, via I/O interface(s) 612 of server computer 130. Software and data used to practice embodiments of the present invention, e.g., dialog import-export program 137, can be stored on such portable computer-readable storage media and can be loaded onto persistent storage 608, of server computer 130, via I/O interface(s) 612 of server computer 130. Software and data used to practice embodiments of the present invention, e.g., dialog components 139, can be stored on such portable computer-readable storage media and can be loaded onto persistent storage 608, of server computer 130, via I/O interface(s) 612 of server computer 130. IO interface(s) 612 also connects to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for interconnecting portlets, the computer program product comprising:
    one or more computer-readable storage media and program instructions stored on the one or more computer-readable storage media, the program instructions comprising:
        program instructions to cause a first view to be displayed on a computing device, wherein the first view is associated with a software application in a first state of a plurality of states of the software application, and wherein the first view includes a first portlet;
        program instructions to receive a first event from the first portlet, wherein the first event includes an indication of a type of the first portlet and data associated with the type of the first portlet;
        program instructions to access a state model for the software application, wherein the state model includes a plurality of transitions between states of the software application, and wherein one transition of the plurality of transitions is triggered to bring the software application in to a second state of the plurality of states of the software application based on the type of the first portlet and the data associated with the type of the first portlet;
        program instructions to execute the one transition of the plurality of transitions to bring the software application in to the second state of the plurality of states of the software application; and
        program instructions to cause a second view to be displayed on the computing device, wherein the second view is associated with the software application in the second state.

2. The computer program product of claim 1, wherein the program instructions to access a state model for the software application comprise:
    program instructions to access a repository that includes a plurality of state models for the software application; and
    program instructions to retrieve a state model from the repository whose signature matches the type of the first portlet.

3. The computer program product of claim 1, wherein the program instructions to access a state model for the software application comprise:
    program instructions to access a repository that includes a plurality of temporarily stored state models related to previously received data associated with the type of the first portlet; and
    program instructions to search the repository for a temporarily stored state model whose signature matches the type of the first portlet and whose related data matches the data associated with the type of the first portlet received in the first event.

4. The computer program product of claim 3, further comprising:
    program instructions, stored on the one or more computer-readable storage media, to retrieve a temporarily stored state model from the repository whose signature matches the type of the first portlet and whose related data matches the data associated with the type of the first portlet received in the first event.

5. The computer program product of claim 3, further comprising,
    in response to the program instructions to search the repository for a temporarily stored state model whose signature matches the type of the first portlet and whose related data matches the data associated with the type of the first portlet received in the first event and not finding a temporarily stored state model whose signature matches the type of the first portlet and whose related data matches the data associated with the type of the first portlet received in the first event, program instructions, stored on the one or more computer-readable storage media, to access a repository that includes a plurality of state models for the software application; and
    program instructions, stored on the one or more computer-readable storage media, to retrieve a state model from the repository whose signature matches the type of the first portlet.

6. The computer program product of claim 1, wherein the second view is the same as the first view.

7. The computer program product of claim 1, wherein a plurality of states of the software application is a dialog of the software application.

8. A computer system for interconnecting portlets, the computer system comprising:
    one or more computer processors, one or more computer-readable storage media, and program instructions stored on the one or more computer-readable storage media for execution by at least one of the one or more processors, the program instructions comprising:
        program instructions to cause a first view to be displayed on a computing device, wherein the first view is associated with a software application in a first state of a plurality of states of the software application, and wherein the first view includes a first portlet;
        program instructions to receive a first event from the first portlet, wherein the first event includes an indication of a type of the first portlet and data associated with the type of the first portlet;
        program instructions to access a state model for the software application, wherein the state model includes a plurality of transitions between states of the software application, and wherein one transition of the plurality of transitions is triggered to bring the software application in to a second state of the plurality of states of the software application based on the type of the first portlet and the data associated with the type of the first portlet;

program instructions to execute the one transition of the plurality of transitions to bring the software application in to the second state of the plurality of states of the software application; and program instructions to cause a second view to be displayed on the computing device, wherein the second view is associated with the software application in the second state.

9. The computer system of claim 8, wherein the program instructions to access a state model for the software application comprise:

program instructions to access a repository that includes a plurality of state models for the software application; and program instructions to retrieve a state model from the repository whose signature matches the type of the first portlet.

10. The computer system of claim 8, wherein the program instructions to access a state model for the software application comprise:

program instructions to access a repository that includes a plurality of temporarily stored state models related to previously received data associated with the type of the first portlet; and program instructions to search the repository for a temporarily stored state model whose signature matches the type of the first portlet and whose related data matches the data associated with the type of the first portlet received in the first event.

11. The computer system of claim 10, further comprising:

program instructions, stored on the one or more computer-readable storage media for execution by at least one of the one or more processors, to retrieve a temporarily stored state model from the repository whose signature matches the type of the first portlet and whose related data matches the data associated with the type of the first portlet received in the first event.

12. The computer system of claim 10, further comprising, in response to the program instructions to search the repository for a temporarily stored state model whose signature matches the type of the first portlet and whose related data matches the data associated with the type of the first portlet received in the first event and not finding a temporarily stored state model whose signature matches the type of the first portlet and whose related data matches the data associated with the type of the first portlet received in the first event, program instructions, stored on the one or more computer-readable storage media for execution by at least one of the one or more processors, to access a repository that includes a plurality of state models for the software application; and program instructions, stored on the one or more computer-readable storage media for execution by at least one of the one or more processors, to retrieve a state model from the repository whose signature matches the type of the first portlet.

13. The computer system of claim 8, wherein the second view is the same as the first view.

* * * * *